US010046398B2

(12) United States Patent
Agic et al.

(10) Patent No.: US 10,046,398 B2
(45) Date of Patent: Aug. 14, 2018

(54) REINFORCED DOUBLE-SIDED CUTTING INSERT AND CUTTING TOOL WITH REINFORCED DOUBLE-SIDED CUTTING INSERT

(71) Applicant: SECO TOOLS AB, Fagersta (SE)

(72) Inventors: Adnan Agic, Fagersta (SE); Per Rickard Jansson, Fagersta (SE)

(73) Assignee: Seco Tools AB, Fagersta (SE)

(*) Notice: Subject to any disclaimer, the term of this patent is extended or adjusted under 35 U.S.C. 154(b) by 258 days.

(21) Appl. No.: 14/569,960

(22) Filed: Dec. 15, 2014

(65) Prior Publication Data

US 2016/0167137 A1 Jun. 16, 2016

(51) Int. Cl.
*B23C 5/20* (2006.01)
*B23B 27/16* (2006.01)
*B23C 5/22* (2006.01)

(52) U.S. Cl.
CPC ........ *B23B 27/1662* (2013.01); *B23C 5/2221* (2013.01); *B23B 2200/0423* (2013.01); *B23B 2200/323* (2013.01); *B23B 2200/3618* (2013.01); *B23B 2200/3627* (2013.01); *B23C 2200/125* (2013.01); *B23C 2200/367* (2013.01)

(58) Field of Classification Search
CPC ............ B23C 5/2221; B23C 2200/125; B23C 2200/367; B23C 2200/361; B23C 2200/366; B23B 27/1622; B23B 2200/323; B23B 2200/3618; B23B 2200/3627
See application file for complete search history.

(56) References Cited

U.S. PATENT DOCUMENTS

| 6,872,034 | B2 * | 3/2005 | Satran | B23C 5/2213 |
| | | | | 407/103 |
| 7,063,489 | B2 * | 6/2006 | Satran | B23C 5/1072 |
| | | | | 407/113 |
| 7,241,082 | B2 | 7/2007 | Smilovici et al. | |
| 8,202,026 | B2 * | 6/2012 | Satran | B23C 5/207 |
| | | | | 407/113 |
| 8,449,230 | B2 * | 5/2013 | Nguyen | B23C 5/109 |
| | | | | 407/113 |
| 2006/0045636 | A1 * | 3/2006 | Johnson | B23C 5/06 |
| | | | | 407/42 |
| 2011/0129309 | A1 * | 6/2011 | Kovac | B23C 5/06 |
| | | | | 407/42 |

* cited by examiner

*Primary Examiner* — Alan Snyder
(74) *Attorney, Agent, or Firm* — WRB-IP LLP

(57) ABSTRACT

A double-sided cutting insert includes two end surfaces that each includes major rake surfaces adjacent major cutting edges that form first angles with planes of major side surfaces of the insert, and a central support surface forming a second angle with the planes of the major side surfaces. Each end surface further includes major intermediate surfaces between the major rake surfaces and the central support surface. The major intermediate surfaces form third angles with the planes of the major side surfaces that are greater than the first angles and smaller than the second armies when measured in a central plane that extends along a central axis of the hole and is generally perpendicular to the planes of the major side surfaces and planes of the central support surfaces.

19 Claims, 4 Drawing Sheets

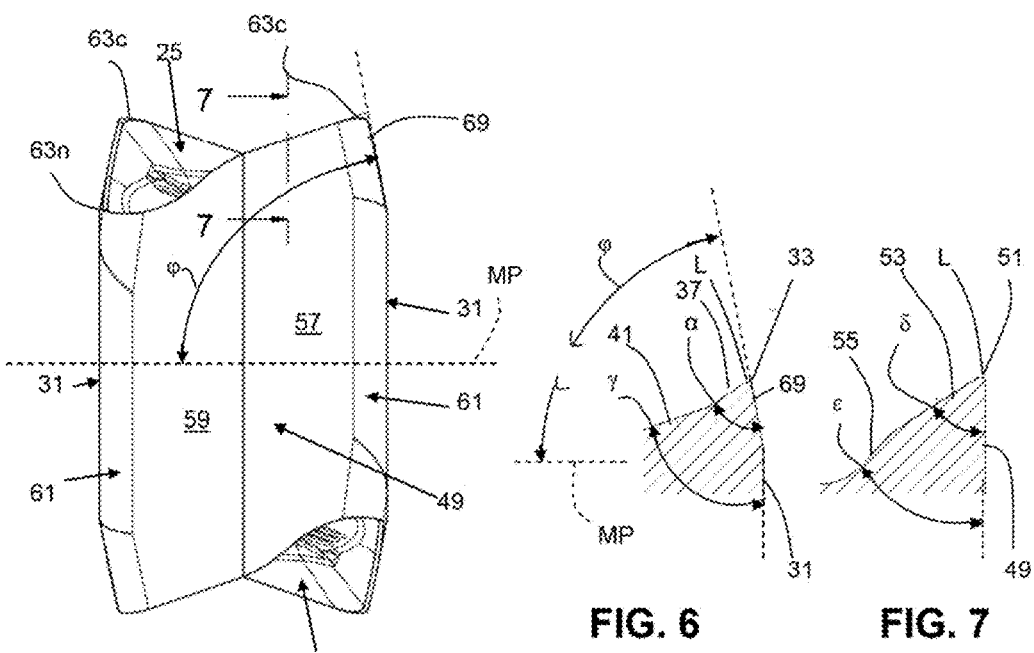
FIG. 4  FIG. 6  FIG. 7
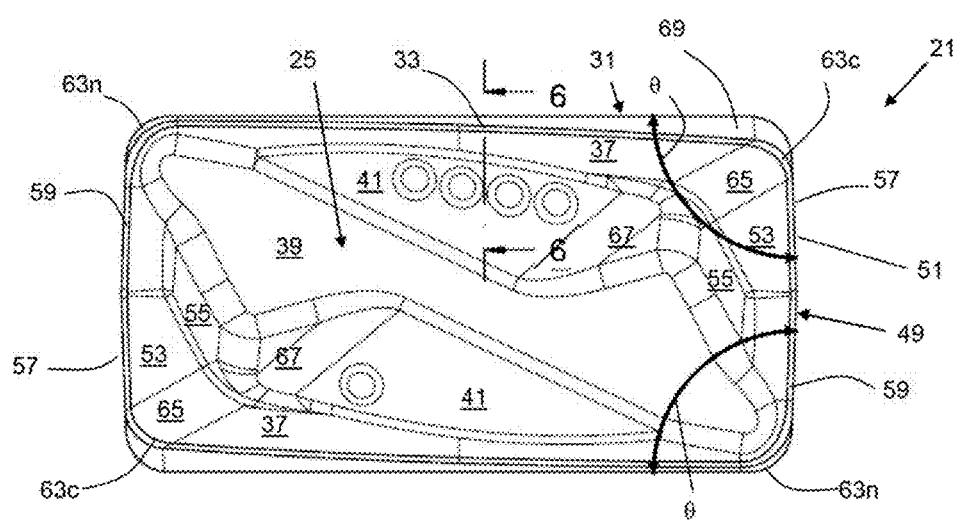
FIG. 5

REINFORCED DOUBLE-SIDED CUTTING INSERT AND CUTTING TOOL WITH REINFORCED DOUBLE-SIDED CUTTING INSERT

BACKGROUND AND SUMMARY

The present invention relates generally to cutting inserts and cutting tools and, more particularly, to double-sided cutting inserts.

In designing, cutting inserts, it is typically desirable to provide the cutting insert with the maximum number of usable cutting edges possible so that the insert can be indexed to different positions to permit use of a new cutting edge when an edge is worn or broken. Inserts are typically mounted to toolholders by means such as clamping screws or bolts, and many current designs permit an insert to be indexed by turning the insert around the bolt so that a fresh cutting edge is moved to a working position. In addition, many current designs are of "double-sided" inserts that permit the insert to be flipped over so that the insert can be indexed around the screw or bolt, such as is shown in U.S. Pat. No. 7,241,082.

When making smaller inserts intended to be used to machine smaller items or shapes, it becomes increasingly difficult to make indexable inserts without compromising the strength of the insert or the ability to provide sufficient surface space on the insert, for mounting of the insert against abutment surfaces on a toolholder. It is necessary to provide a hole through the insert for the mounting screw or bolt and, particularly in the case of double-sided cutting inserts, as insert size becomes smaller, a trade-off must often he made between providing a smaller, more fragile screw or bolt or a more fragile insert that has only minimal insert material between the hole and working surfaces of the insert.

It is desirable to provide a cutting insert and cutting tool that facilitates providing a hole of maximum size in an insert while still providing substantial strength to the insert.

According to an aspect of the present invention, a double-sided cutting insert comprises two identical opposing end surfaces, each end surface having four corners, a peripheral side surface extending between the opposing end surfaces, the peripheral side surface comprising two opposing identical major side surfaces, four spaced apart major cutting edges, each major cutting edge being formed at an intersection of each major side surface with each end surface, and a hole extending through the insert from one of the major side surfaces to the other of the major side surfaces, wherein each end surface comprising major rake surfaces adjacent the major cutting edges that form first angles with planes of the major side surfaces, and a central support surface forming a second angle with the planes of the major side surfaces, and each end surface comprises major intermediate surfaces between the major rake surfaces and the central support surface, the major intermediate surfaces forming third angles with the planes of the major side surfaces that are greater than the first angles and smaller than the second angles when measured in a central plane that extends along a central axis of the hole and is generally perpendicular to the planes of the major side surfaces and planes of the central support surfaces.

A cutting tool according to an aspect of the invention includes a double-sided cutting insert as described above in combination with a toolholder comprising a body and a pocket formed in the body for receiving the cutting insert, the pocket comprising major side and central support abutment surfaces for abutting against respective ones of the major side surfaces and one of the central support surfaces.

BRIEF DESCRIPTION OF THE DRAWINGS

The features and advantages of the present invention are well understood by reading the following detailed description in conjunction with the drawings in which like numerals indicate similar elements and in which:

FIG. 4 is an end view of the cutting insert of FIG. 1;

FIG. 5 is a top view of the cutting insert of FIG. 1;

FIG. 6 is a cross-sectional view of a portion of the cutting insert taken at section 6-6 of FIG. 5;

FIG. 7 is a cross-sectional view of a portion of the cutting insert taken at section 7-7 of FIG. 4.

DETAILED DESCRIPTION

Figure 8:
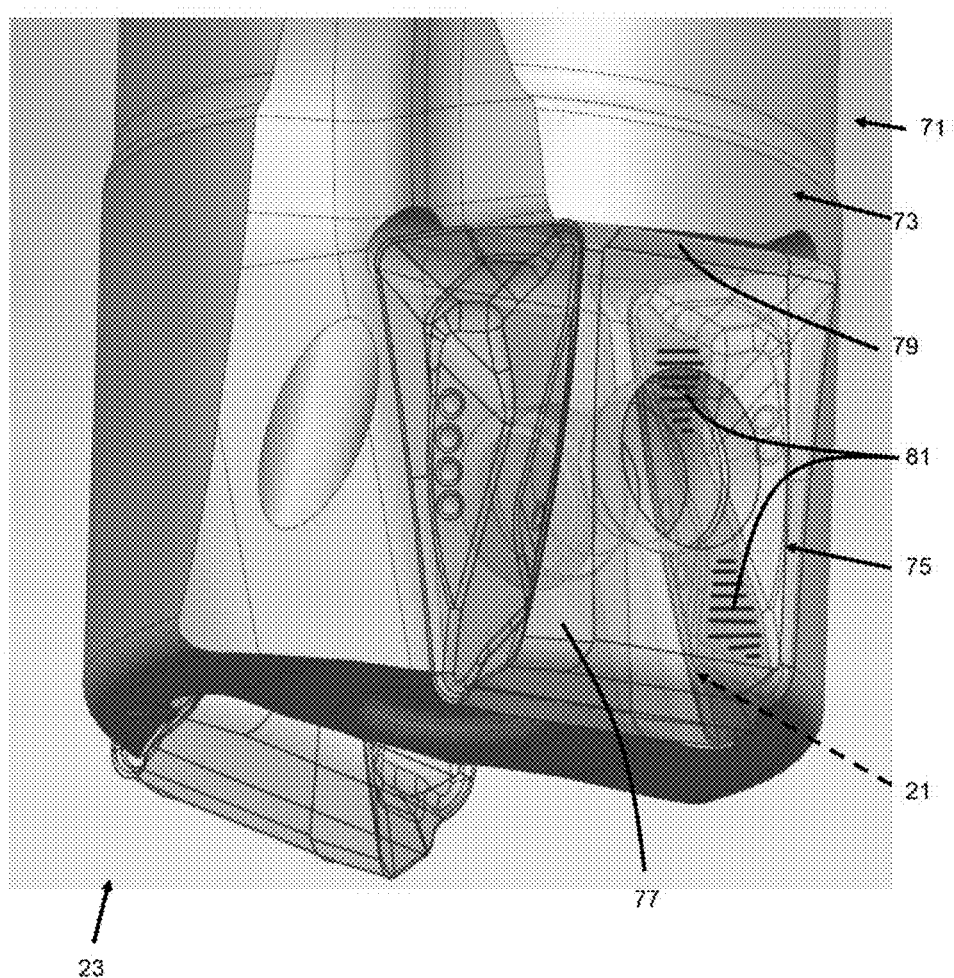
FIG. 8 is a perspective view of a cutting tool according to an aspect of the present invention.

A double-skied cutting insert 21 according to an aspect of the present invention is shown in FIGS. 1-5 and is adapted for use in a cutting tool 23 according to another aspect of the invention shown in FIG. 8. The insert 21 comprises two identical opposing end surfaces 25, each end surface haying four corners 27.

The insert 21 further comprises a peripheral side surface 29 extending between the opposing end surfaces 25. The peripheral side surface 29 comprises two opposing identical major side surfaces 31.

The insert 21 further comprises four spaced apart major cutting edges 33, each major cutting edge being formed at an intersection of each major side surface 31 with each end surface; 25.

A hole 35 extends through the insert 21 from one of the major side surfaces 31 to the other of the major side surfaces 31.

Figure 1:
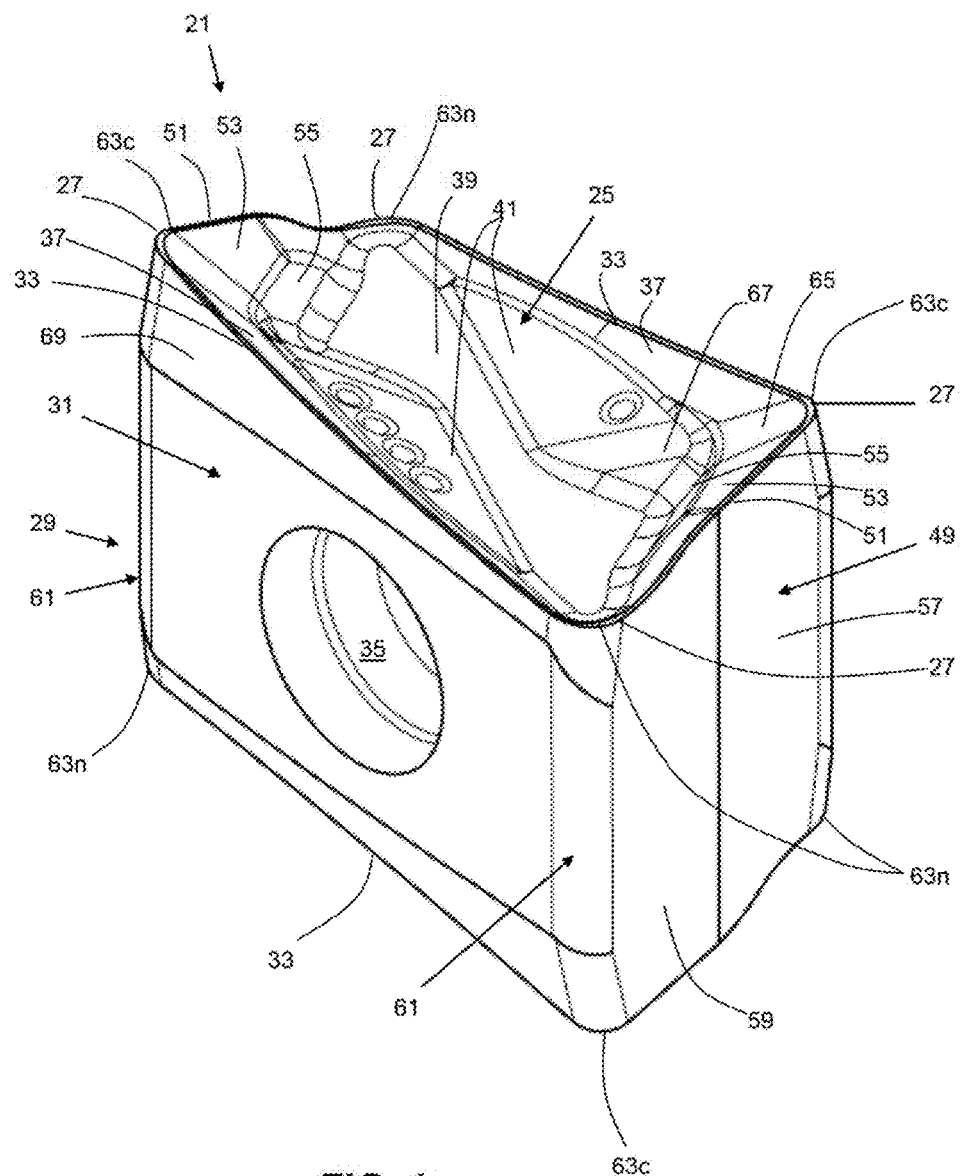
FIG. 1 is a perspective view of a cutting insert according to an aspect of the present invention.
Figure 2:
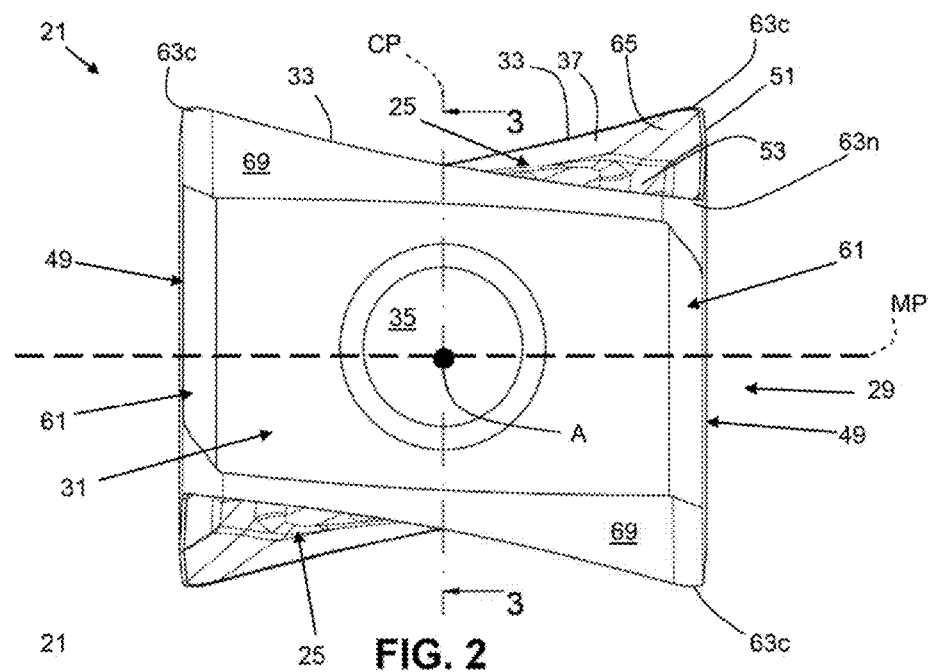
FIG. 2 is a side view of the cutting insert of FIG. 1.

As seen, for example, in FIG. 1, each end surface 25 comprises major rake surfaces 37 adjacent the major cutting edges 33. For purposes of the present application, the rake surfaces and the major cutting edges should be considered to be adjacent although a land L (FIGS. 6-7) may be disposed between them. As seen, for example, in FIG. 6, the major rake surfaces 37 form first angles α with planes of the major side surfaces 31. Although the major side surfaces 31 will typically include at least a planar portion and will be generally flat, this is not necessary, however, and references shall be made herein to the planes of the major side surfaces where the planes are generally tangent to the major side surfaces.

Each end surface 25 further comprises a central support surface 39 forming a second angle β (FIG. 3) with the planes of the major side surfaces 31 (and with planes of minor side surfaces 49). Typically, but not necessarily, a plane of the central support surface 39 is perpendicular to the planes of the major side surfaces 31, and both the central support surface and the major side surfaces are flat to facilitate their use as support surfaces for supporting, the insert 21 against similarly flat abutment surfaces in a pocket of a toolholder of the cutting 23.

Each end surface 25 further comprises major intermediate surfaces 41 between the major rake surfaces 37 and the central support surface 39. As seen, for example, in FIG. 3, the major intermediate surfaces 41 form third angles γ with the planes of the major side surfaces 31 that are greater than the first angles α and smaller than the second angles β when measured in a central plane CP (FIG. 2) that extends along a central axis A of the hole 35 and is generally perpendicular to the planes of the major side surfaces 31 and planes of the central support surfaces 39.

Figure 3:
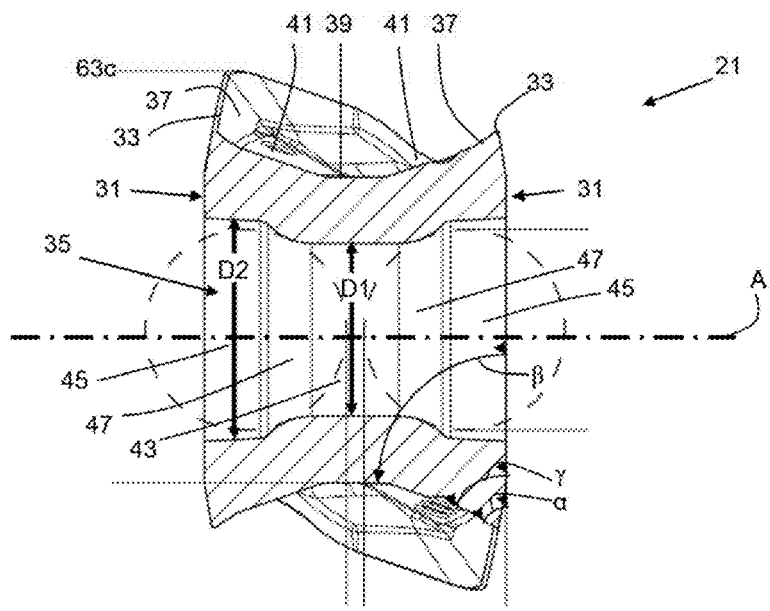
FIG. 3 is a cross-sectional view of the cutting insert taken at section 3-3 of FIG. 2.

As seen in FIG. 3, the hole 35 typically comprises a central portion 43 having a first diameter D1 and outer portions 45 at the major side surfaces 31 having a second diameter D2 that is lamer than the first diameter. The hole 35 further includes transition regions 47 between the central portion 43 and the outer portions 45. The transition regions 47 change in diameter from the first diameter D1 where they join the central portion 43 to the second diameter D2 where they join respective ones of the outer portions 45. The length and location of the central portion 43, the outer portions 45, and the transition regions 47 can be selected to optimize the strength of the insert 21 and thereby reinforce the insert while still providing a large hole 35 in a small insert 21. Particularly, it is desirable to provide a maximum amount of insert material between the surface of the hole 35 and a closest exterior surface of the insert 21, particularly an end surface 25 of the insert.

The transition regions 47 can be convex toward the central axis A of the hole. In this way, a maximum amount of material can be provided over the length of the transition regions 47 to reinforce the insert. The convex shape of the transition regions 47 is also useful as a clamping surface for the head of a bolt (not shown) (which is typically convex or conical) that will extend through the hole 35 to clamp the insert 21 to a toolholder.

As seen in FIG. 3, the thickness of the material between the surface of the hole and the end surfaces 25 can be maximized, along the central plane CP, by providing the transition regions 47 in locations so that they are disposed entirely between the major intermediate surfaces 41 on the opposing end surfaces, thereby providing maximum reinforcement for the insert. Providing the major intermediate surfaces 41 thus facilitates obtaining a stronger, less fragile insert 21 by facilitating greater insert thickness while not detracting from the functioning of the rake and other chip forming structures on the end surfaces 25. It also facilitates providing, a hole 35 that is of maximum size so that a large screw or bolt can be used to secure the insert 21 to a toolholder, thereby reducing the risk of breakage of the screw or bolt.

As seen, for example, in FIG. 1, the peripheral side surface 29 further comprises two opposing identical minor side surfaces 49. The insert 21 comprises four spaced apart minor cutting edges 51. Each minor cutting edge 51 is fanned at an intersection of each minor side surface 49 with each end surface 25. Each end surface 25 comprises minor rake surfaces 53 adjacent the minor cutting edges 51 that form fourth angles δ (FIG. 7) with planes of the minor side surfaces 49, and minor intermediate surfaces 55 between the minor rake surfaces 51 and the central support surface 39. The minor intermediate surfaces 55 forming fifth angles ε (FIG. 7) with the planes of the minor side surfaces that are smaller than the fourth angles δ and smaller than the second angles β.

Each minor side surface 49 may be planar but typically comprises first and second surface portions 57 and 59 that each extend between the opposing end surfaces 25 that may be individually but are not necessarily planar, and wherein, as seen in FIG. 5, planes of each of the first and second surface portions form obtuse angles θ with respective closest ones of the planes of the major side surfaces 31.

The peripheral side surface 29 further comprises four corner surfaces 61. Each corner surface 51 is disposed between and joins one of the major side surfaces 31 and one of the minor side surfaces 49. The insert 21 thus comprises eight spaced apart corner edges. Each corner edge is formed at an intersection of each corner surface 61 with each end surface 25.

Ordinarily, the four corners 27 of each end surface 25 comprise four of the corner edges including two diagonally opposed corner cutting edges 63*c* and two diagonally opposed non cutting corner edges 63*n*. Each end surface 25 comprises corner rake surfaces 65 adjacent the corner cutting edges 63*c* and corner intermediate surfaces 67 between the corner rake surfaces and the central support surface 39. Each corner rake surface 65 is disposed between and joins one of the major rake surfaces 37 and one of the minor rake surfaces 53. Each corner intermediate surface 67 is disposed between and joins one of the major intermediate surfaces 41 and one of the minor intermediate surfaces 55. Each corner intermediate surface 67 can form a convex projection relative to an adjacent central support surface 39 that can facilitate breakage and removal of chips formed when machining a workpiece. Each corner rake surface 65 is concave, The major and minor intermediate surfaces 41 and 55 also typically form part of the convex projection.

Typically, the four corners 27 of each end surface comprise two diagonally opposed lowered corners (by 63*n*) and two diagonally opposed raised corners (by 63*c*), the lowered corners being closer to a median plane MP of the insert (seen in, e.g., FIG. 2), the median plane extending along the central axis A of the hole 37 and being generally perpendicular to the central plane CP, than the raised corners.

As seen, for example, in FIG. 1, each major side surface 31 can comprise a major relief surface 69 adjacent each major cutting edge 33. As seen, for example, in FIGS. 4 and 6, a line tangent to each major relief surface 69 extending from the major cutting edge 31 adjacent each major relief surface is inclined to the planes of the central support surfaces 39 and the median plane MP at an acute interior angle φ. Typically, for each major relief surface 69, the acute interior angle φ increases from one end of the major relief surface (closest to the corner cutting edge 63*c*) to an opposite end of the major relief surface (closest to the corner non-cutting edge 63*n*), the major relief surface can be twisted.

A cutting tool 23 according to an aspect of the invention is shown in FIG. 8 and comprises one or more double-sided cutting inserts 21 (shown in phantom in FIG. 8) and a toolholder 71 comprising a body 73 having a pocket 75 formed in the body for receiving to cutting insert. The pocket 75 comprises major side, minor side, and central support abutment surfaces 77, 79, and 81 for abutting against respective ones of the major side surfaces 31, the minor side surfaces 49, and the central support surfaces 39 of the insert. When the minor side surface 49 comprises first and second surface portions 57 and 59, the minor side abutment surface 79 abuts against one of the first and second surface portions, typically the one of the first and second surface portions that is disposed most radially outwardly when the insert is mounted on the toolholder, which can provide better support for the insert than if contact were only with the innermost surface. By having the first and second surface portions 57 and 59 form obtuse angles with the closest ones of the major side surfaces, it is possible to mount the insert so that the one of the surface portions closest to a working corner cutting edge 63c is perpendicular to the axis of the cutting and will form a generally flat surface, while the one of the surface portions that is furthest from the working corner cutting edge is relieved relative to the workpiece. The central support abutment surface 81 may comprise at least two coplanar, spaced apart projections for supporting a planar central support surface 39 of the insert.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A double-sided cutting insert, comprising:
   two identical opposing end surfaces, each end surface having four corners;
   a peripheral side surface extending between the opposing end surfaces, the peripheral side surface comprising two opposing identical major side surfaces;
   four spaced apart major cutting edges, each major cutting edge being formed at an intersection of each major side surface with each end surface; and
   a hole extending through the insert from one of the major side surfaces to the other of the major side surfaces,
   wherein each end surface comprises
      major rake surfaces adjacent the major cutting edges that form first interior angles with planes of the major side surfaces,
      a single flat central support surface forming second interior angles with the planes of the major side surfaces,
      major intermediate surfaces between the major rake surfaces and the central support surface, the major intermediate surfaces forming third interior angles with the planes of the major side surfaces that are greater than the first interior angles and smaller than the second interior angles when measured in a central. plane that extends along a central axis of the hole and is generally perpendicular to the planes of the major side surfaces and planes of the central support surfaces, and
      the central support surface is closer to the hole than the major intermediate surface.

2. The double-sided cutting insert as set forth in claim 1, wherein the hole comprises a central portion having a first diameter and outer portions at the major side surfaces having a second diameter that is larger than the first diameter, and transition regions between the central portion and the outer portions, the transition regions changing in diameter from the first diameter where they join the central portion to the second diameter where they join respective ones of the outer portions.

3. The double-sided cutting insert as set forth in claim 2, wherein the transition regions are convex toward the central axis of the hole.

4. The double-sided cutting insert as set forth in claim 2, wherein, along the central plane, the transition regions are disposed entirely between major intermediate surfaces on the opposing end surfaces.

5. The double-sided cutting insert as set forth in claim 1 wherein the peripheral side surface comprises two opposing identical minor side surfaces, and the insert comprises four spaced apart minor cutting edges, each minor cutting edge being formed at an intersection of each minor side surface with each end surface, each end surface comprising minor rake surfaces adjacent the minor cutting edges that form fourth interior angles with planes of the minor side surfaces, and minor intermediate surfaces between the minor rake surfaces and the central support surface, the minor intermediate surfaces forming fifth interior angles with the planes of the minor side surfaces that are smaller than the fourth interior angles and smaller than the second interior angles.

6. The double sided cutting insert as set forth in claim 5, wherein each minor side surface comprises first and second surface portions that each extend between the opposing end surfaces and wherein planes of each of the first and second surface portions form obtuse interior angles with respective closest ones of the planes of the major side surfaces.

7. The double-sided cutting insert as set forth in claim 5, wherein the peripheral side surface comprises four corner surfaces, each corner surface being disposed between and joining one of the major side surfaces and one of the minor side surfaces, and the insert comprises eight spaced apart corner edges, each corner edge being formed at an intersection of each corner surface with each end surface, the four corners of each end surface comprising two diagonally opposed corner cutting edges and two diagonally opposed corner non-cutting edges each end surface comprising corner rake surfaces adjacent the corner cutting edges and corner intermediate surfaces between the corner rake surfaces and the central support surface, each corner rake surface being disposed between and joining one of the major rake surfaces and one of the minor rake surfaces, each corner intermediate surface being disposed between and joining one of the major intermediate surfaces and one of the minor intermediate surfaces, each corner intermediate surface forming a convex projection relative to an adjacent central support surface.

8. The double sided cutting insert as set forth in claim 7, wherein each corner rake surface is concave.

9. The double-sided cutting insert as set forth in claim 1 wherein the four corners of each end surface comprises two diagonally opposed lowered corners and two diagonally opposed raised corners, the lowered corners being closer to a median plane of the insert, the median plane extending along the central axis of the hole and being generally perpendicular to the central plane, than the raised corners.

10. The double-sided cutting insert as set forth in claim 1, wherein each major side surface comprises a major relief surface adjacent each major cutting edge, wherein, in a cross-section of the cutting insert taken in a plane parallel to the central plane, a line tangent to each major relief surface extending from the major cutting edge adjacent each major relief surface is inclined to the planes of the central support surfaces at an acute interior angle.

11. The double-sided cutting insert as set forth in claim 10. wherein, for each major relief surface, the acute interior angle increases from one end of the major relief surface to an opposite end of the major relief surface.

12. The double-sided cutting insert as set forth in claim 1, wherein each major intermediate surface forms part of a convex projection relative to an adjacent central support surface.

13. The double-sided cutting insert as set forth in claim 1, wherein each major side surface is flat.

14. The double-sided cutting insert as set forth in claim 1, wherein the peripheral side surface comprises two opposing identical minor side surfaces, and the insert comprises four spaced apart minor cutting edges. each minor cutting edge being formed at an intersection of each minor side surface with each end surface.

15. The double sided cutting insert as set forth in claim 14, wherein each minor side surface comprises first and second surface portions that each extend between the opposing end surfaces and that each form obtuse interior angles with respective closest ones of the major sides surfaces.

16. The double-sided cutting insert as set forth in claim 15, wherein, for each minor side surface, the first and second surface portions are flat.

17. A cutting tool, comprising:
a double-sided cutting insert, comprising
two identical opposing end surfaces, each end surface having four corners;
a peripheral side surface extending between the opposing end surfaces, the peripheral side surface comprising two opposing identical major side surfaces,
four spaced apart major cutting edges, each major cutting edge being formed at an intersection of each major side surface with each end surface, and
a hole extending through the insert from one of the major side surfaces to the other of the major side surfaces,
wherein each end surface comprises
major rake surfaces adjacent the major cutting edges that form first interior angles with planes of the major side surfaces,
a single flat central support surface forming second interior angles with the planes of the major side surfaces,
major intermediate surfaces between the major rake surfaces and the central support surface, the major intermediate surfaces forming third interior angles with the planes of the major side surfaces that are greater than the first interior angles and smaller than the second interior angles when measured in a central plane that extends along a central axis of the hole and is generally perpendicular to the planes of the major side surfaces and planes of the central support surfaces, and
the central support surface is closer to the hole than the major intermediate surface; and
a toolholder comprising a body and a pocket formed in the body for receiving the cutting insert, the pocket comprising major side and central support abutment surfaces for abutting against respective ones of the Major side surfaces and one of the central support surfaces.

18. The cutting tool as set forth in claim 17, wherein the peripheral side surface comprises two opposing identical minor side surfaces, and the insert comprises four spaced apart minor cutting edges, each minor cutting edge being formed at an intersection of each minor side surface with each end surface, the pocket comprising a minor side abutment surface for abutting against one of the minor side surfaces.

19. The cutting tool as set forth in claim 18, wherein each minor side surface comprises first and second surface portions that each extend between the opposing end surfaces and that each form obtuse interior angles with respective closest ones of the major sides surfaces, the minor side abutment surface abutting against one of the first and second surface portions.

* * * * *